(12) United States Patent
Prior

(10) Patent No.: US 9,032,840 B2
(45) Date of Patent: May 19, 2015

(54) EVACUATED TRANSMISSION CASE

(75) Inventor: Gregory P. Prior, Birmingham, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 1422 days.

(21) Appl. No.: 12/755,622

(22) Filed: Apr. 7, 2010

(65) Prior Publication Data
US 2011/0247454 A1    Oct. 13, 2011

(51) Int. Cl.
*F16H 57/02* (2012.01)
*F16H 57/04* (2010.01)
*F16H 61/00* (2006.01)

(52) U.S. Cl.
CPC ......... *F16H 57/0461* (2013.01); *Y10T 74/2186* (2015.01); *F16H 57/0443* (2013.01)

(58) Field of Classification Search
CPC .................... F16H 57/0461; F16H 57/0443
USPC ......... 74/606 R, 733.1, 336 R, 335, 339, 745, 74/473.31, 473.26, 473.15, 416; 137/1, 137/14; 475/159
See application file for complete search history.

(56) References Cited

U.S. PATENT DOCUMENTS

| | | | | |
|---|---|---|---|---|
| 3,020,776 A | * | 2/1962 | May et al. | 477/97 |
| 3,151,718 A | * | 10/1964 | Temple | 192/3.27 |
| 3,599,513 A | * | 8/1971 | Buno et al. | 477/156 |
| 3,740,951 A | * | 6/1973 | Mori | 60/465 |
| 3,752,009 A | * | 8/1973 | Chana | 477/61 |
| 4,142,427 A | * | 3/1979 | Grevich | 477/33 |
| 4,331,045 A | * | 5/1982 | Piech et al. | 477/114 |
| 4,406,261 A | * | 9/1983 | Ikeura | 477/111 |
| 4,465,030 A | * | 8/1984 | Maurer | 123/198 P |
| 4,621,544 A | * | 11/1986 | Re | 477/156 |
| 5,101,936 A | * | 4/1992 | Paredes et al. | 184/6.13 |
| 5,129,422 A | * | 7/1992 | Davison et al. | 137/599.09 |
| 5,175,608 A | * | 12/1992 | Nihei et al. | 257/751 |
| 5,259,273 A | * | 11/1993 | Lee | 477/156 |
| 5,382,202 A | * | 1/1995 | Solove et al. | 475/124 |
| 5,445,042 A | * | 8/1995 | Deady | 74/329 |
| 5,694,817 A | * | 12/1997 | Reid | 74/606 R |
| 5,749,060 A | * | 5/1998 | Graf et al. | 340/439 |
| 6,202,478 B1 | * | 3/2001 | Blomquist et al. | 73/49.7 |

(Continued)

FOREIGN PATENT DOCUMENTS

EP          0791740 B1 *  11/2000

OTHER PUBLICATIONS

English translation for reference EP0791740B1.*

*Primary Examiner* — Jason Holloway
*Assistant Examiner* — Rachid Bendidi

(57) ABSTRACT

A vehicle transmission includes at least one rotatable component and is disposed in an environment at a first pressure. A transmission housing includes a sump portion disposed near a bottom portion of the transmission housing, where the transmission housing substantially encloses the at least one rotatable component. A hydraulic fluid is disposed at least partially in the sump portion of the transmission housing and a vacuum source is in pneumatic communication with the transmission housing. The vacuum source at least partially evacuates a gas from the transmission housing so that an interior of the transmission housing is at a second pressure. The at least one rotatable component is partially exposed to a gas at the second pressure and partially submerged in the hydraulic fluid when the transmission is under a predetermined dynamic load.

20 Claims, 3 Drawing Sheets

(56) References Cited

U.S. PATENT DOCUMENTS

| | | | |
|---|---|---|---|
| 6,286,309 B1* | 9/2001 | Horton et al. | 60/468 |
| 7,276,006 B2* | 10/2007 | Reed et al. | 475/5 |
| 7,926,751 B2* | 4/2011 | Musch et al. | 241/33 |
| 8,147,380 B2* | 4/2012 | Fritzer | 477/158 |
| 2002/0158530 A1* | 10/2002 | Gennesseaux | 310/112 |
| 2004/0179953 A1* | 9/2004 | Suzuki et al. | 417/310 |
| 2008/0006635 A1* | 1/2008 | Bader et al. | 220/374 |
| 2008/0156374 A1* | 7/2008 | Nakano et al. | 137/14 |
| 2009/0090799 A1* | 4/2009 | Musch et al. | 241/57 |
| 2009/0143182 A1* | 6/2009 | Thomas et al. | 475/159 |
| 2009/0165453 A1* | 7/2009 | Stehr | 60/494 |
| 2010/0120583 A1* | 5/2010 | Fritzer | 477/158 |
| 2012/0237367 A1* | 9/2012 | Cunningham et al. | 417/55 |

* cited by examiner

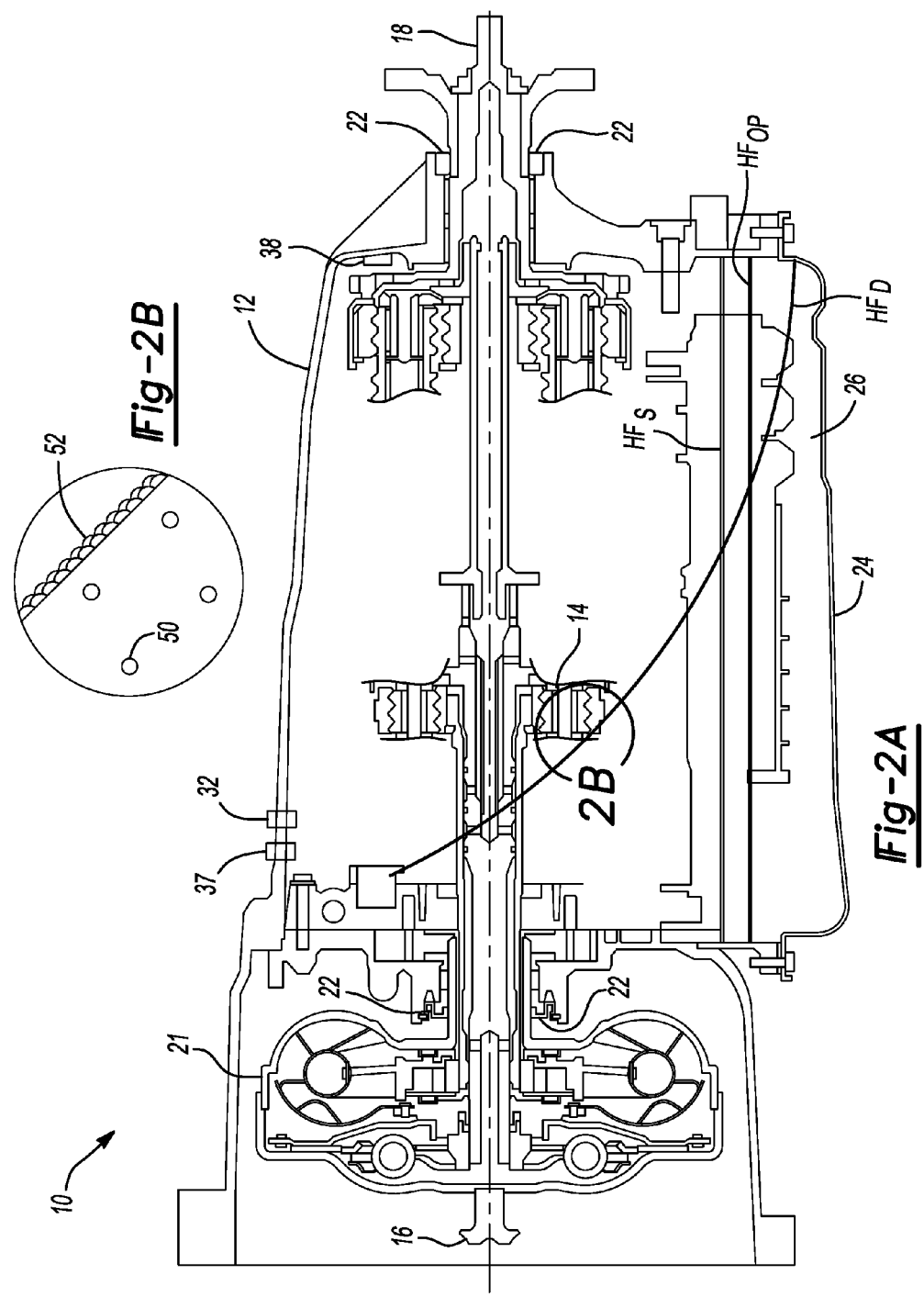

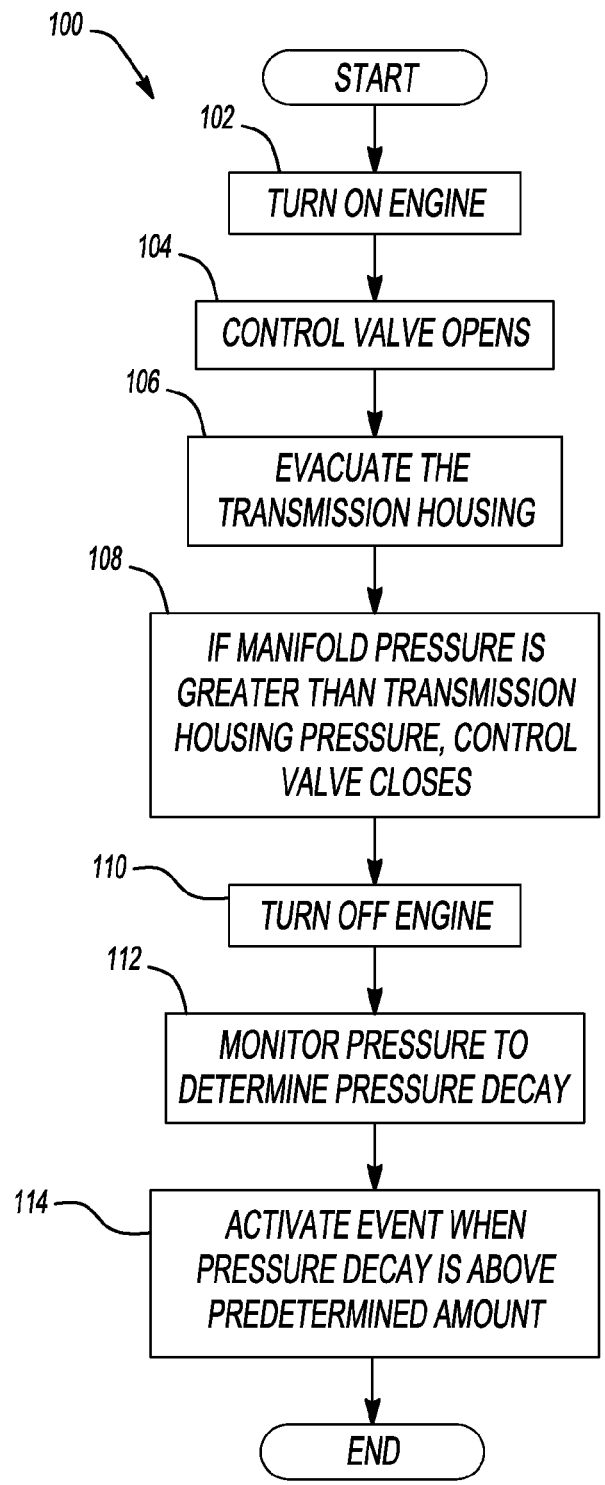

US 9,032,840 B2

EVACUATED TRANSMISSION CASE

TECHNICAL FIELD

The invention relates to a vehicle transmission, and more particularly to a vehicle transmission that is at least partially evacuated of air during operation.

BACKGROUND

A typical automatic transmission for a vehicle includes an oil sump and a variety of rotating components. The oil sump holds hydraulic fluid for use in lubrication, cooling, and hydraulic control of solenoids and valve assemblies within the transmission. The hydraulic fluid typically does not contact the rotating components of the transmission when the vehicle is not experiencing dynamic loading, such as braking, acceleration, or cornering of the vehicle. During dynamic loading, however, the hydraulic fluid within the oil sump may shift so that the rotating components are at least partially submerged in the hydraulic fluid. Submersion of the rotatable components in the hydraulic fluid may drag air into the hydraulic fluid thereby causing fluid aeration and foaming. The air within the transmission case that is dragged into the hydraulic fluid is typically at or near the ambient air pressure of the environment outside of the transmission case due to venting of the transmission case. Fluid aeration and foaming reduce lubrication effectiveness and may cause pressure variations when the hydraulic fluid is later used for transmission lubrication and control.

One method of reducing this aeration and foaming is to use a deeper oil sump so that the hydraulic fluid needs to travel farther to reach the rotating components during dynamic loading. Deeper oil sumps, however, increase the size and weight of the vehicle transmission. Although previous transmissions are functional, new and improved transmissions which exhibit improved performance of hydraulic fluids and controls are desirable. Accordingly, there is a need for an improved transmission that exhibits less fluid aeration and foaming of the hydraulic fluid during dynamic loading of the vehicle.

SUMMARY

A vehicle transmission includes a transmission housing, a vacuum source, at least one rotatable component, and is disposed in an environment at a first pressure. The transmission housing substantially encloses the at least one rotatable component and includes a sump portion disposed near a bottom portion of the transmission housing. A hydraulic fluid is disposed at least partially in the sump portion of the transmission housing. The vacuum source is in pneumatic communication with the transmission housing and at least partially evacuates a gas from the transmission housing so that an interior of the transmission housing is at a second pressure. The at least one rotatable component is partially exposed to the gas at the second pressure.

In one example of the vehicle transmission, the second pressure is lower than the first pressure.

In another example of the vehicle transmission, the vacuum source is an intake manifold of an engine of the vehicle.

In yet another example of the vehicle transmission, the vacuum source is a dedicated dry sump pump.

In yet another example of the vehicle transmission, one of a check valve and a solenoid valve is disposed between the vacuum source and the transmission housing.

In yet another example of the vehicle transmission, a hydraulic pump is in fluid communication with the sump of the transmission housing to circulate the hydraulic fluid throughout the vehicle transmission.

In yet another example of the vehicle transmission, the rotatable component is partially submerged in the hydraulic fluid when the transmission is under a predetermined dynamic load that is a force imposed by normal use of the vehicle.

In yet another example of the vehicle transmission, the hydraulic fluid is included in a predetermined amount and the sump has a predetermined depth. The predetermined amount and the predetermined depth are selected so that the hydraulic fluid is substantially at a top portion of the sump when the vehicle transmission is not in operation.

In yet another example of the vehicle transmission, a pressure sensor is disposed in the transmission housing for determining the second pressure.

In yet another example of the vehicle transmission, the pressure sensor is in electronic communication with a controller having control logic that determines a rate of decay of the second pressure to determine whether there are leaks in the transmission housing.

In yet another example of the vehicle transmission, at least one dynamic seal is configured for operating under vacuum on an interior of the transmission housing.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

FIG. 2A is a cross sectional view of a vehicle transmission of FIG. 1 according to the principles of the present invention;

FIG. 2B is an expanded view of an interface between hydraulic fluid and air within the transmission of FIG. 2A according to the principles of the present invention; and FIG. 3 is a flowchart of a method of operating a transmission of a vehicle according to the principles of the present invention.

DESCRIPTION

Figure 1:
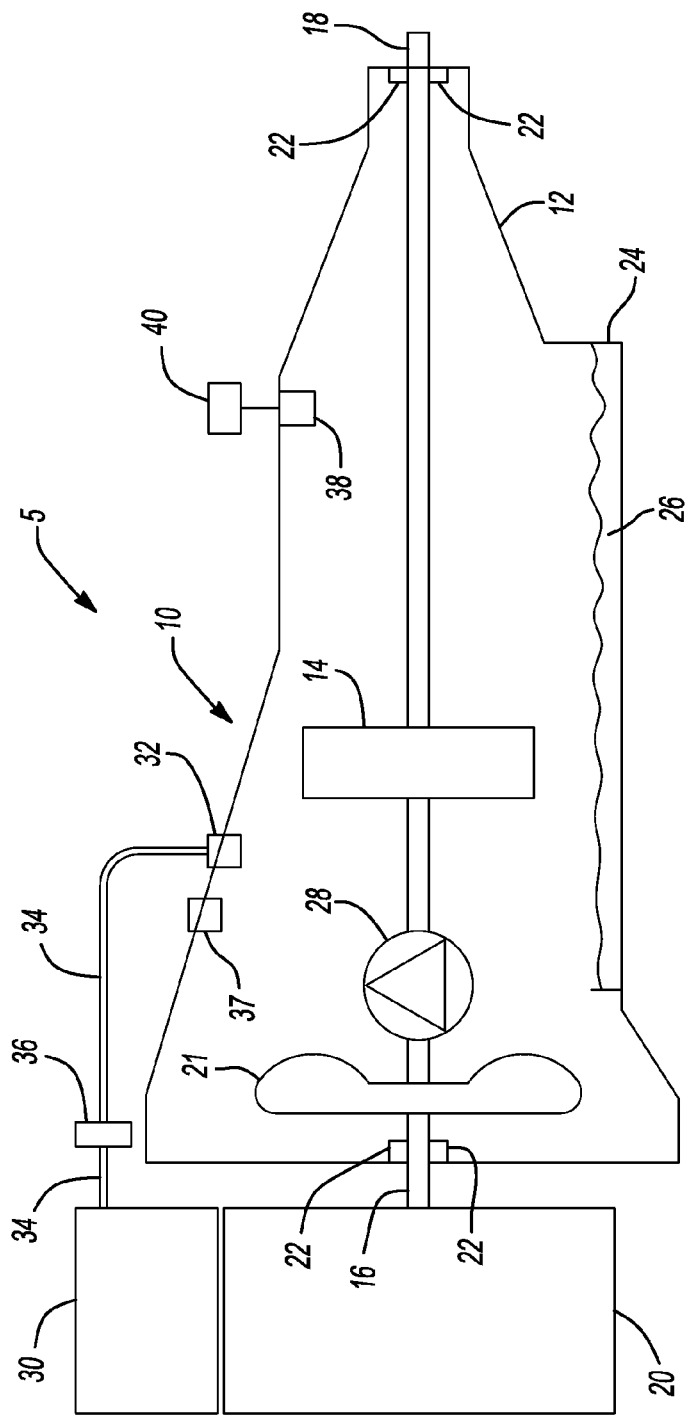
FIG. 1 is a block diagram of an exemplary vehicle powertrain according to the principles of the present invention.

With reference to FIG. 1, an exemplary powertrain 5 incorporating a transmission 10 according to the present invention is illustrated in block diagram form. In the example provided, the transmission 10 is a typical rear wheel drive automatic transmission disposed in an environment having ambient air at a first pressure. The transmission 10, however, may be a front wheel drive transmission without departing from the scope of the present invention. The automatic transmission 10 includes a transmission case or housing 12 that generally encloses a plurality of gear sets and a plurality of shafts. The housing 12 includes a variety of apertures, passageways, shoulders and flanges which position and support these components. The plurality of gear sets may include individual intermeshing gears, such as planetary gear sets, that are connected to or selectively connectable to the plurality of shafts. The plurality of shafts may include layshafts or countershafts, sleeve and center shafts, reverse or idle shafts, or combinations thereof. It should be appreciated that the specific arrangement and number of the gear sets and the specific arrangement and number of the shafts within the transmission 10 may vary without departing from the scope of the present disclosure.

The transmission 10 includes at least one rotatable component 14, an input shaft 16, and an output shaft 18. In the example provided, the rotatable component 14 is one of the plurality of gear sets that is substantially enclosed by the transmission housing 12. The rotatable component 14, however, may be a clutching or other rotatable component 14 without departing from the scope of the present invention. The input shaft 16 is connected with and receives power from an engine 20. The engine 20 may be a conventional internal combustion engine or an electric engine, or any other type of prime mover, without departing from the scope of the present disclosure. Additional components, such as hydrodynamic fluid driving devices such as a torque converter 21 or fluid couplings, may be disposed between the engine 20 and the transmission 10 without departing from the scope of the present disclosure. The output shaft 18 is preferably connected with a final drive unit (not shown) which may include, for example, propshafts, differential assemblies, and drive axles.

Turning to FIG. 2A and with continued reference to FIG. 1, at least one seal 22 is disposed in the transmission housing 12 to at least partially seal the transmission housing 12 to restrict the rate of air flow from the ambient environment into the transmission housing 12. The seals 22 are preferably dynamic seals configured to operate under vacuum on the inside of the transmission housing 12, such as is done with dry sump engines. In the example provided, the seals 22 are configured to seal between the transmission housing 12 and the shafts 16, 18. The seals 22, however, may also be located at other locations within the transmission housing 12 where ambient air may enter the transmission 10. For example, additional seals 22 could be disposed between a shift lever (not shown) and the housing 12 to seal the housing 12 while allowing manual changes to the operating mode of the transmission 10, such as shifting from park operating mode to reverse operating mode.

A sump 24 disposed near a bottom portion of the housing 12 stores and collects hydraulic fluid 26 that may be used for lubrication, cooling and hydraulic control of solenoids and valve assemblies within the transmission 10. The hydraulic fluid 26 is included in an amount up to a fill line HF that varies with the operating condition of the transmission 10. In FIG. 2A, three exemplary hydraulic fill lines HF are shown for an amount of hydraulic fluid 26: a static fill line $HF_S$, an operating fill line $HF_{OP}$, and a dynamic fill line $HF_D$. The static fill line $HF_S$ represents the fill level of the hydraulic fluid 26 when the transmission 10 is not operating and is not under dynamic load. In the example provided, a depth of the sump 24 and an amount of the hydraulic fluid 26 are selected so that the static fill line $HF_S$ is substantially at a top portion of the sump 24. The operating fill line $HF_{OP}$ represents the fill level of the hydraulic fluid 26 when the transmission 10 is operating and is not under dynamic load. The operating fill line $HF_{OP}$ has a height within the sump 24 less than a height within the sump 24 of the static fill line $HF_S$. The dynamic fill line $HF_D$ represents the fill level of the hydraulic fluid 26 when the transmission 10 is under dynamic load from normal operation of the vehicle, such as acceleration of the vehicle during braking, cornering, or forward acceleration. It should be appreciated that a straightened or irregular dynamic fill line $HF_D$ may also represent the level of hydraulic fluid 26 when the vehicle and the transmission 10 are on a sloped surface or are otherwise not oriented so that gravity acts substantially directly towards a bottom portion of the sump 24 in normal operation. Rollover and crash events may create a similar fill line $HF_D$, but are not considered dynamic loading from normal operation for purposes of this description. A pump 28 is connected to the housing 12 between the torque converter 21 and the rotatable component 14 to pressurize the hydraulic fluid 26 for circulation through the transmission 10. It should be appreciated that there may be more than one pump 28 and the pump 28 may be any positive displacement pump, such as a geroter pump.

A low pressure component or vacuum source 30 is in gaseous or pneumatic communication with the housing 12 at a pressure port 32 disposed in the housing 12 above the hydraulic fill line HF for lowering the air pressure within the housing 12 to a second pressure. In the example provided, the vacuum source 30 is an intake manifold of an engine of the vehicle to reduce the amount of weight, cost, and parasitic losses added to the vehicle. The vacuum source 30, however, may be other components having other configurations, such as a dedicated transmission dry sump pump to allow more effective scavenging and potentially lower vacuum levels, without departing from the scope of the present invention. The vacuum source 30 pneumatically communicates with the transmission housing 12 through a pneumatic passageway 34 connected between the vacuum source 30 and the pressure port 32. It should be appreciated that the pneumatic passageway 34 may be a separate tube or be integrally formed within the housing 12 of the transmission 10 without departing from the scope of the present invention. The vacuum source 30 at least partially evacuates the housing 12 so that the air per unit volume within the housing 12 is less than the air per unit volume of the ambient air.

In the example provided, a solenoid valve or control valve or check valve 36 is disposed between the vacuum source 30 and the housing 12 to regulate the air pressure within transmission housing 12. More specifically, the check valve 36 is oriented to limit air flow from the intake manifold 30 to the transmission housing 12 when the intake manifold 30 is above the second pressure within the transmission housing 12. Therefore, the check valve 36 maintains a vacuum in the transmission housing 12 even when the intake manifold 30 vacuum fluctuates with throttle position. In alternative embodiments, a solenoid valve 36 is oriented to limit air flow from the transmission housing 12 to the intake manifold 30 to limit the amount of pressure increase in the intake manifold 30 that may occur from, for example, air leaks leading to unmetered air flow from the transmission housing 12. Therefore, vacuum from the intake manifold 30 would be more readily available for other devices. An additional solenoid valve 37 may be disposed between the housing 12 and the environment and configured to allow the housing 12 to return to ambient pressure upon opening of the solenoid valve 37. In one embodiment of the present invention, the solenoid valve 37 opens after engine shutdown and decay rate determination to allow ambient air to enter the housing 12. It should be appreciated that the solenoid valve 36 may be configured to open when the ignition is off or may be configured not to open when the ignition is off without departing from the scope of the present invention. In alternative embodiments, the solenoid valve 37 is omitted.

A pressure sensor 38 is connected to the housing 12 to monitor air pressure within the housing 12. The pressure sensor 38 may be of any suitable type. The pressure sensor 38 is preferably in electronic communication with a controller 40. The controller 40 is generally an electronic device having a preprogrammed digital computer or processor, control logic, memory used to store data, and at least one I/O peripheral. In the example provided, the controller 40 includes control logic to determine the rate of decay of the vacuum within the housing 12 upon shutting down the engine. The rate of decay may be used to detect potential fluid leaks in the housing 12. In alternative embodiments, the pressure sensor 38 is omitted.

During operation of the vehicle, dynamic loading on the transmission 10 may cause the hydraulic fluid 26 to have the dynamic fill line $HF_D$. The rotatable component 14 is disposed at least partially below the dynamic fill line $HF_D$ so that the rotatable component 14 is at least partially submerged in the hydraulic fluid 26.

As the engine operates, air inside the intake manifold 30 is drawn into combustion cylinders (not shown) in the engine 20 when engine pistons are on downward strokes and intake valves on the engine are open. As the air is drawn into the cylinders, the pressure within the intake manifold 30 decreases. When the pressure within the intake manifold 30 is higher than the second pressure in the transmission housing 12, the check valve 36 restricts air flow from the intake manifold 30 to the housing 12. When the pressure within the intake manifold 30 is lower than the second pressure in the transmission housing 12, air flows from the housing 12 through the pressure port 32, through the pneumatic passageway 34, and through the check valve 36 to reach the intake manifold 30. Therefore, the second pressure in the housing 12 remains at substantially the lowest pressure achieved by the intake manifold 30 when there are no leaks in the housing 12.

As is best seen in FIG. 2B, rotation of the rotatable component 14 causes air bubbles 50 to be entrained in the hydraulic fluid 26 and foam bubbles 52 to be disposed on the dynamic fill line $HF_D$. Because air within the housing 12 is at a pressure lower than the air pressures of previous transmissions, there are fewer air bubbles 50 and foam bubbles 52 relative to the prior art. In addition, windage and pumping losses along with hydraulic fluid 26 temperatures are also reduced. The present invention is particularly effective in applications with more dynamic loading and higher temperatures, such as towing trucks and track use.

Referring now to FIG. 3, and with continued reference to FIGS. 1, 2A, and 2B, a method of operating the transmission 10 is shown and generally indicated by reference number 100. The transmission 10 is disposed in an environment at a first pressure. In step 102, the engine 20 is turned on. In step 104, a control valve 36 opens when the pressure in the manifold 30 is less than the second pressure. In step 106, the housing 12 is evacuated by the intake manifold 30 through the pneumatic passageway 34. In step 108, the control valve 36 closes and restricts air flow from the manifold 30 to the housing 12 when the second pressure is lower than a pressure in the manifold 30. In step 110, the engine is turned off and in step 112 the second pressure is monitored to determine pressure decay in the housing 12. If the pressure decay is larger than a predetermined amount an event may be triggered in step 114. In the example provided, the event of step 114 is activating a warning light in the vehicle. In an alternative embodiment the event of step 114 is activating an electronic flag. In yet another alternative embodiment the event of step 114 is altering the shift range of the transmission 10 by causing the transmission 10 to shift to higher gear ratios at engine speeds lower than during normal operation.

The present invention provides decreased aeration and foaming of hydraulic fluid in a transmission operated under dynamic loading. The reduced aeration and foaming contribute to increased lubrication, more consistent pressures, and reduced temperatures in the transmission. Therefore, the present invention is an improvement over current transmissions.

The description of the invention is merely exemplary in nature and variations that do not depart from the general essence of the invention are intended to be within the scope of the invention. Such variations are not to be regarded as a departure from the spirit and scope of the invention.

The invention claimed is:

1. A vehicle transmission including at least one rotatable component and disposed in an environment at a first pressure, the vehicle transmission comprising:
   a transmission housing including a sump portion disposed near a bottom portion of the transmission housing, wherein the transmission housing substantially encloses the at least one rotatable component;
   a hydraulic fluid disposed at least partially in the sump portion of the transmission housing up to a hydraulic fill line; and
   a vacuum source in pneumatic communication with the transmission housing above the hydraulic fill line, and wherein the vacuum source at least partially evacuates a gas from the transmission housing so that an interior of the transmission housing is at a second pressure, and wherein the at least one rotatable component is partially exposed to the gas at the second pressure.

2. The vehicle transmission of claim 1, wherein the second pressure is lower than the first pressure.

3. The vehicle transmission of claim 2, wherein the vacuum source is an intake manifold of an engine of the vehicle.

4. The vehicle transmission of claim 2, wherein the vacuum source is a dedicated dry sump pump.

5. The vehicle transmission of claim 2 further including one of a check valve and a solenoid valve disposed between the vacuum source and the transmission housing.

6. The vehicle transmission of claim 2 further including a hydraulic pump in fluid communication with the sump of the transmission housing to circulate the hydraulic fluid throughout the vehicle transmission.

7. The vehicle transmission of claim 2, wherein the rotating component is at least partially submerged in the hydraulic fluid when the transmission is under a predetermined dynamic load, and wherein the predetermined dynamic load is a force imposed by normal use of the vehicle.

8. The vehicle transmission of claim 2, wherein the hydraulic fluid is included in a predetermined amount and the sump has a predetermined depth, wherein the predetermined amount and the predetermined depth are selected so that the hydraulic fluid is substantially at a top portion of the sump when the vehicle transmission is not in operation.

9. The vehicle transmission of claim 2 further including a pressure sensor disposed in the transmission housing for determining the second pressure.

10. The vehicle transmission of claim 9, wherein the pressure sensor is in electronic communication with a controller having control logic that determines a rate of decay of the second pressure to determine whether there are leaks in the transmission housing.

11. The vehicle transmission of claim 2 further including at least one dynamic seal configured for operating under vacuum on an interior of the transmission housing.

12. A method of operating a vehicle transmission including a transmission housing that substantially encloses at least one rotatable component, the transmission housing disposed in an environment at a first pressure and including a sump portion disposed near a bottom of the transmission housing and at least partially filled with hydraulic fluid up to a hydraulic fill line, wherein the transmission housing is in pneumatic communication with a vacuum source, the method comprising the steps of:
- at least partially evacuating a gas from the transmission housing with the vacuum source so that an interior of the transmission housing is at a second pressure wherein the gas is evacuated from the transmission housing above the hydraulic fill line;
- providing a predetermined dynamic load to the transmission so that the at least one rotatable component is partially exposed to the gas at the second pressure and partially submerged in the hydraulic fluid; and
- operating the transmission so that the rotatable component rotates while at least partially submerged in the hydraulic fluid.

13. The method of claim 12, wherein the step of at least partially evacuating a gas from the transmission housing with the vacuum source so that an interior of the transmission housing is at a second pressure comprises lowering the second pressure below the first pressure.

14. The method of claim 13, wherein the step of at least partially evacuating a gas from the transmission housing with the vacuum source includes the further step of providing an intake manifold of an engine of the vehicle as the source of the vacuum.

15. The method of claim 13 further including the step of restricting air flow between the vacuum source and the transmission housing with one of a check valve and a solenoid valve when a pressure of the vacuum source is higher than the second pressure.

16. The method of claim 13, wherein the predetermined dynamic load is a force imposed by normal use of the vehicle.

17. The method of claim 13 further including the step of determining the second pressure with a pressure sensor.

18. The method of claim 17 further including the step of determining a rate of decay of the second pressure using the pressure sensor to determine whether there are leaks in the transmission housing.

19. The method of claim 18 further including the step of opening the check valve after the engine is turned off and the rate of decay has been determined.

20. The method of claim 18 further including the step of activating an event when it is determined that there are leaks in the transmission housing, wherein the event is at least one of activating a warning signal, activating an electronic flag, and reducing a shift range of the transmission.

* * * * *